United States Patent
Clack (10) Patent No.: US 9,929,580 B2
(45) Date of Patent: Mar. 27, 2018

(54) POWER TOOL ELECTRONICS

(71) Applicant: TTI (MACAO COMMERCIAL OFFSHORE) LIMITED, Macau (MO)

(72) Inventor: Justin Clack, Anderson, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 15/223,400

(22) Filed: Jul. 29, 2016

(65) Prior Publication Data

US 2018/0034298 A1   Feb. 1, 2018

(51) Int. Cl.
| | |
|---|---|
| H02P 1/00 | (2006.01) |
| H02J 7/00 | (2006.01) |
| B23D 45/04 | (2006.01) |
| B25F 5/00 | (2006.01) |

(52) U.S. Cl.
CPC .......... *H02J 7/0063* (2013.01); *B23D 45/046* (2013.01); *B25F 5/00* (2013.01); *H02J 2007/0067* (2013.01)

(58) Field of Classification Search
CPC ............. H02J 2007/0067; H02J 7/0068; H02J 7/0013; H02J 7/0018; H02J 7/0027; H02J 7/02; H02J 7/34; H02J 2007/0059; H02J 7/0057; H02J 9/061; H02J 7/0063; H02J 7/0031; H02J 7/0016; H02J 7/045
USPC .......................... 318/139, 478; 320/118, 128
See application file for complete search history.

(56) References Cited

U.S. PATENT DOCUMENTS

| | | | | |
|---|---|---|---|---|
| 5,621,250 A | * | 4/1997 | Kim .......................... | B60L 1/00 307/10.1 |
| 5,794,055 A | * | 8/1998 | Langer .................... | H02J 9/005 713/300 |
| 6,741,066 B1 | * | 5/2004 | Densham .................. | H02J 7/02 320/145 |
| 6,977,482 B2 | * | 12/2005 | Popescu-Stanesti .. | H02J 7/0018 320/116 |

(Continued)

FOREIGN PATENT DOCUMENTS

| | | |
|---|---|---|
| EP | 2562894 | 2/2013 |
| EP | 2944432 | 11/2015 |

OTHER PUBLICATIONS

European Search Report for Application No. 17183858.4 dated Dec. 15, 2017, 13 pages.

*Primary Examiner* — Paul Ip
(74) *Attorney, Agent, or Firm* — Michael Best & Friedrich LLP (57) ABSTRACT

A battery waking circuit and a battery leakage circuit are provided. The battery waking circuit includes a first battery pack and a second battery pack connected in series and a first switch connected to the first battery pack along a first current path. An electronic controller coupled to and controlling the first witch is configured to detect a trigger actuation and close the first switch based on detecting the trigger actuation to draw a wake-up current on the first current path from the first battery pack. The electronic controller is also configured to control a motor to draw a load current along a second current path after the first battery pack is woken up. The battery leakage circuit also includes a switch connected in series with the capacitor and a trigger switch controlling the switch such that the switch prevents a flow of leakage current through the capacitor when the trigger is not actuated.

26 Claims, 8 Drawing Sheets

(56) References Cited

U.S. PATENT DOCUMENTS

| | | | | |
|---|---|---|---|---|
| 7,348,760 B2* | 3/2008 | Bucur | H02J 7/0013 | 320/132 |
| 7,564,220 B2* | 7/2009 | Niculae | H02J 7/0013 | 320/131 |
| 7,619,391 B2* | 11/2009 | Loong | G05F 5/00 | 320/134 |
| 7,683,577 B2* | 3/2010 | Bucur | H01M 2/1016 | 320/112 |
| 7,791,314 B2* | 9/2010 | Bucur | H02J 7/0013 | 320/132 |
| 7,936,151 B2* | 5/2011 | Bucur | H01M 2/1016 | 320/112 |
| 8,144,024 B2* | 3/2012 | Akimov | G01R 31/025 | 320/128 |
| 8,319,650 B2* | 11/2012 | Volodymyr | G01R 31/025 | 320/128 |
| 8,350,529 B2* | 1/2013 | Loncarevic | H02J 7/0016 | 320/118 |
| 8,350,534 B2* | 1/2013 | Niculae | H02J 7/0013 | 320/162 |
| 8,421,466 B2* | 4/2013 | Kang | G01R 27/18 | 324/429 |
| 8,581,552 B2* | 11/2013 | Bucur | H01M 2/1016 | 320/132 |
| 2004/0160213 A1* | 8/2004 | Stanesti | H02J 7/0018 | 320/116 |
| 2004/0178766 A1* | 9/2004 | Bucur | H02J 7/0013 | 320/112 |
| 2006/0139005 A1* | 6/2006 | Niculae | H02J 7/0013 | 320/132 |
| 2006/0197498 A1* | 9/2006 | Bucur | H01M 2/1016 | 320/114 |
| 2007/0126407 A1* | 6/2007 | Loong | G05F 5/00 | 323/210 |
| 2008/0231117 A1* | 9/2008 | Bucur | H02J 7/0013 | 307/48 |
| 2009/0278499 A1* | 11/2009 | Niculae | H02J 7/0013 | 320/132 |
| 2010/0001737 A1* | 1/2010 | Kubo | B60L 11/18 | 324/434 |
| 2010/0052615 A1* | 3/2010 | Loncarevic | H02J 7/0016 | 320/118 |
| 2010/0171467 A1* | 7/2010 | Bucur | H01M 2/1016 | 320/135 |
| 2010/0171502 A1* | 7/2010 | Bucur | H01M 2/1016 | 324/427 |
| 2010/0237872 A1* | 9/2010 | Kang | G01R 27/18 | 324/429 |
| 2010/0327813 A1* | 12/2010 | Bucur | H02J 7/0013 | 320/134 |
| 2011/0074334 A1* | 3/2011 | Wang | G07F 11/00 | 320/101 |
| 2011/0199223 A1* | 8/2011 | Akimov | G01R 31/025 | 340/636.1 |
| 2011/0248653 A1* | 10/2011 | Brotto | B25F 5/021 | 318/139 |
| 2013/0082658 A1* | 4/2013 | Hanai | H01M 10/482 | 320/118 |
| 2013/0207613 A1* | 8/2013 | Loncarevic | H02J 7/0016 | 320/134 |
| 2014/0292245 A1* | 10/2014 | Suzuki | H02P 23/0004 | 318/478 |
| 2014/0334270 A1* | 11/2014 | Kusakawa | G04G 9/00 | 368/9 |
| 2015/0180257 A1* | 6/2015 | Snyder | H01M 10/441 | 320/103 |
| 2015/0357853 A1 | 12/2015 | Suzuki et al. | | |
| 2016/0056655 A1* | 2/2016 | Kaneda | H02J 7/0016 | 320/136 |

* cited by examiner

POWER TOOL ELECTRONICS

FIELD OF THE INVENTION

This application relates to electronics of power tools. More specifically, the application relates to battery leakage circuits and battery waking circuits of power tools.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

One embodiment discloses a method of waking up a power tool power source including a first battery pack and a second battery pack. The method includes detecting, using an electronic controller, a trigger actuation and controlling, using the electronic controller, a first switch to close based on detecting the trigger actuation. The method also includes drawing a wake-up current from the first battery pack upon closing the first switch and controlling a motor to draw a load current after the first battery pack is woken-up by the wake-up current.

Another embodiment provides a power tool including a first battery pack and a second battery pack connected in series, a first switch connected to the first battery pack along a first current path, and an electronic controller coupled to and controlling the first switch. The electronic controller is configured to detect a trigger actuation and close the first switch based on detecting the trigger actuation to draw a wake-up current on the first current path from the first battery pack. The electronic controller is also configured to control the motor to draw a load current after the first battery pack is woken up.

Another embodiment provides a method of preventing leakage current in a power tool. The method includes controlling, by a trigger, a leakage switch to close based on actuation the trigger and permitting a flow of leakage current through a capacitor based on closing the leakage switch, the capacitor coupled to a power supply of the power tool. The method also includes controlling, by the trigger, the leakage switch to open based on de-actuation of the trigger and preventing the flow of leakage current through the capacitor and the leakage switch based on opening the leakage switch.

Another embodiment provides a power tool including a power supply having a positive terminal and a negative terminal and a capacitor coupled across the positive terminal and the negative terminal of the power supply. The power tool also includes a leakage switch connected between the capacitor and the negative terminal and a motor coupled across the capacitor and the leakage switch. The power tool further includes a trigger controlling the leakage switch such that the leakage switch permits a flow of leakage current through the capacitor when the trigger is actuated and prevents the flow of leakage current through the capacitor when the trigger is de-actuated.

Figure 1:
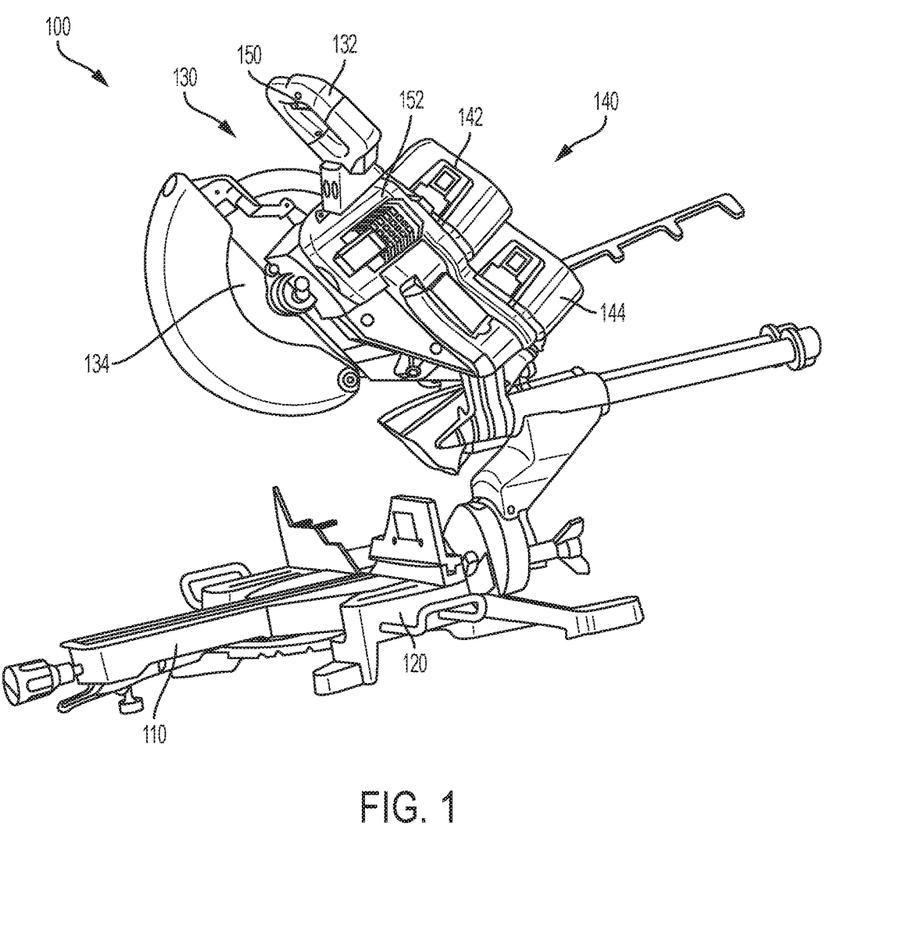
FIG. 1 is a perspective view of a miter saw in accordance with some embodiments.

FIG. 1 illustrates a miter saw 100 operable to perform cuts (for example, a miter cut or a bevel cut) on a work piece (for example, lumber). In the illustrated example, the miter saw includes a turntable 110 that rotates relative to a base 120. The base 120 and the turntable define a support surface for the work piece to be cut. A saw unit 130 is coupled to the turntable 110 for movement with the turntable 110 and includes a saw arm 132 and a saw blade 134. A power supply unit 140 including a first battery pack 142 and a second battery pack 144 powers a motor of the saw unit 130 to rotate the saw blade 134. The saw arm 132 includes a trigger 150 that, when actuated, operates the saw unit 130. The saw arm 132 further includes a housing 152 in which various electronics of the miter saw 100 reside and on which are battery receptacles to receive the first battery pack 142 and the second battery pack 144.

Figure 2:
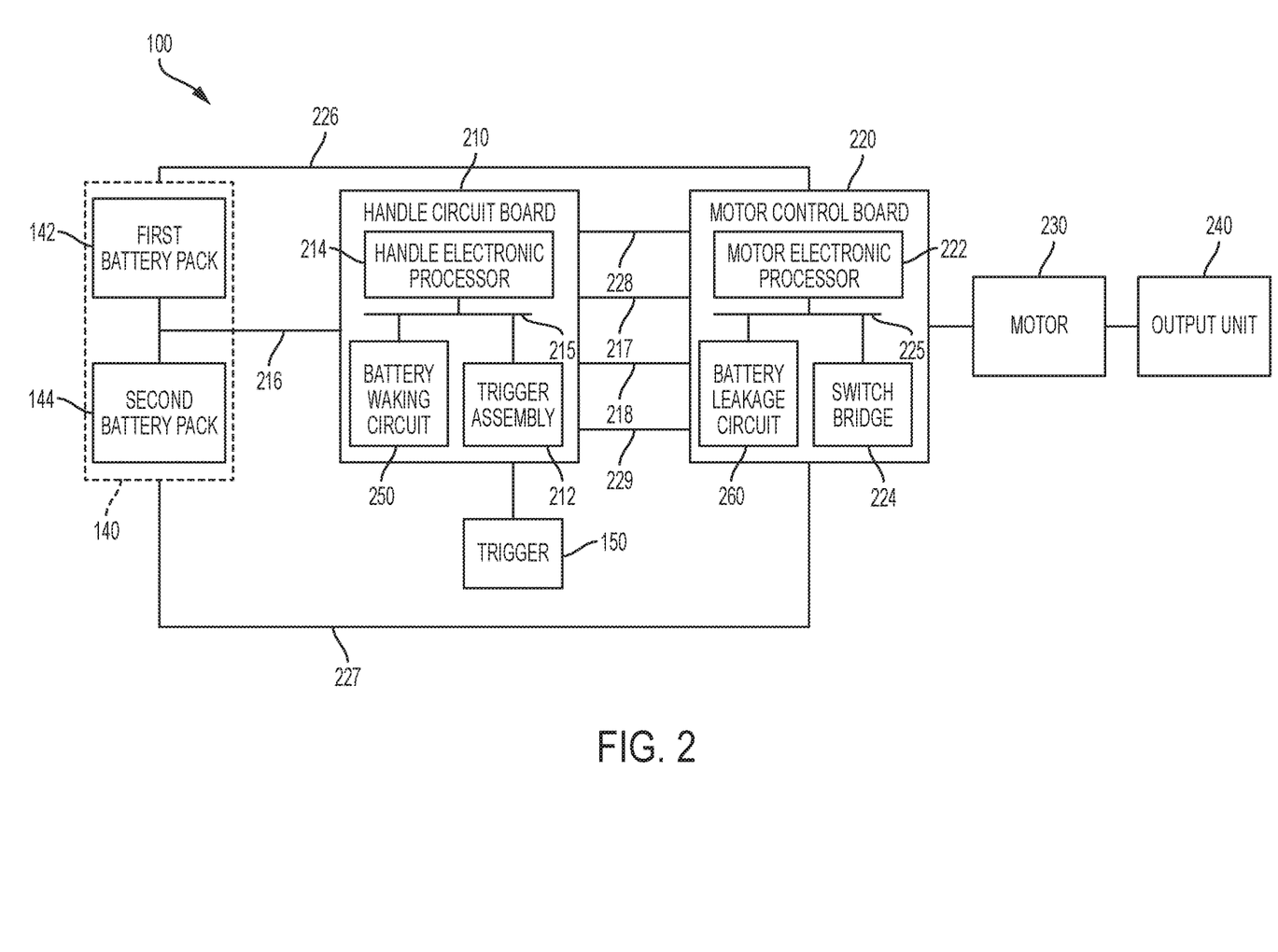
FIG. 2 is a block diagram of the miter saw of FIG. 1 in accordance with some embodiments.

FIG. 2 is a block diagram of the miter saw 100 of FIG. 1. The miter saw 100 includes the power supply 140, a handle circuit board 210, a motor control board 220, a motor 230, and an output unit 240 (for example, the saw blade 134). The power supply 140 provides power for operation of the miter saw 100. The power supply 140 includes the first battery pack 142 and the second battery pack 144. The handle circuit board 210 is located in the saw arm 132 and includes a trigger assembly 212 that is coupled to the trigger 150. Accordingly, the handle circuit board 210 is connected to the trigger 150 that is used to operate the miter saw 100. When a user actuates the trigger 150, generally, the handle circuit board 210 connects the power supply 140 to the electronics of the miter saw 100.

The handle circuit board 210 includes a handle electronic processor 214 to control the operations of the handle electronics. Handle electronics may include a laser or light emitting diodes (LEDs) to be turned on during the operation of the miter saw to illuminate a work piece, illuminate a cutline on the work piece, or both. The handle circuit board 210 also includes a battery waking circuit 250 to wake-up the first battery pack 142 before the operation of the motor 230 of the miter saw 100. The trigger assembly 212, the handle electronic processor 214, and the battery waking circuit 250 communicate over one or more control and/or data buses (for example, a communication bus 215). The handle circuit board 210 is connected via a line 216 (e.g., a conductive wire) to the positive terminal of the second battery pack 144 and to the negative terminal of the first battery pack 142. The handle circuit board receives operating power over the line 216.

The motor control board 220 includes a motor electronic processor 222 and a switch bridge 224 to control an operation of the motor 230. The motor control board 220 also includes a battery leakage circuit 260 to prevent leakage current from the power supply 140 during a non-operating state of the miter saw 100. The motor electronic processor 222, the switch bridge 224 and the battery leakage circuit communicate over one or more control and/or data buses (for example, a communication bus 225). The motor control board 220 is connected to the positive terminal of the first battery pack 142 and the negative terminal of the second battery pack 144 over lines 226 and 227, respectively. The motor control board 220 receives load current for operation of the motor 230 over the lines 226 and 227. The motor control board 220 provides load current for operation of the motor 230 through the switch bridge 224. The motor electronic processor 222 provides control signals to the switch bridge 224 to selectively supply power to stator coils of the motor 230 to operate the motor 230.

The handle circuit board 210 and the motor control board 220 are connected by four lines 217, 218, 228, and 229. The handle circuit board 210 provides operating power for the electronics of the motor control board 220 over the line 217. That is, the handle circuit board 210 provides the power received from the second battery pack 144 over the line 216 to the motor control board 220 over the line 217. The handle circuit board 210 provides information regarding trigger actuation over the line 218. For example, the handle circuit board 210 may send a high signal when the trigger 150 is actuated and a low signal when the trigger 150 is de-actuated. The motor electronic processor 222 uses the signal received over the line 218 to control the switch bridge 224. The motor control board 220 provides positive power supply from the positive terminal of the first battery pack 142 over the line 228 and the negative supply or ground from the negative terminal of the second battery pack 144 over the line 229. That is, the motor control board 220 provides the power received from the power supply 140 over the lines 226 and 227 to the handle circuit board 210 over the lines 228 and 229. For example, the motor controller 220 includes a positive supply node connecting the line 226 and the line 228, and a negative supply node connecting the line 227 and the line 229. In some embodiments, each of the handle controller board 210 and the motor control board 220 may be directly coupled to the power supply 140 via each of the lines 216, 226, and 227, rather than having indirect connections via the other of the motor control board 220 or hall control board 210. The handle circuit board 210, the motor control board 220, and the motor 230 are located within the housing 152 (see FIG. 1)

Figure 3:
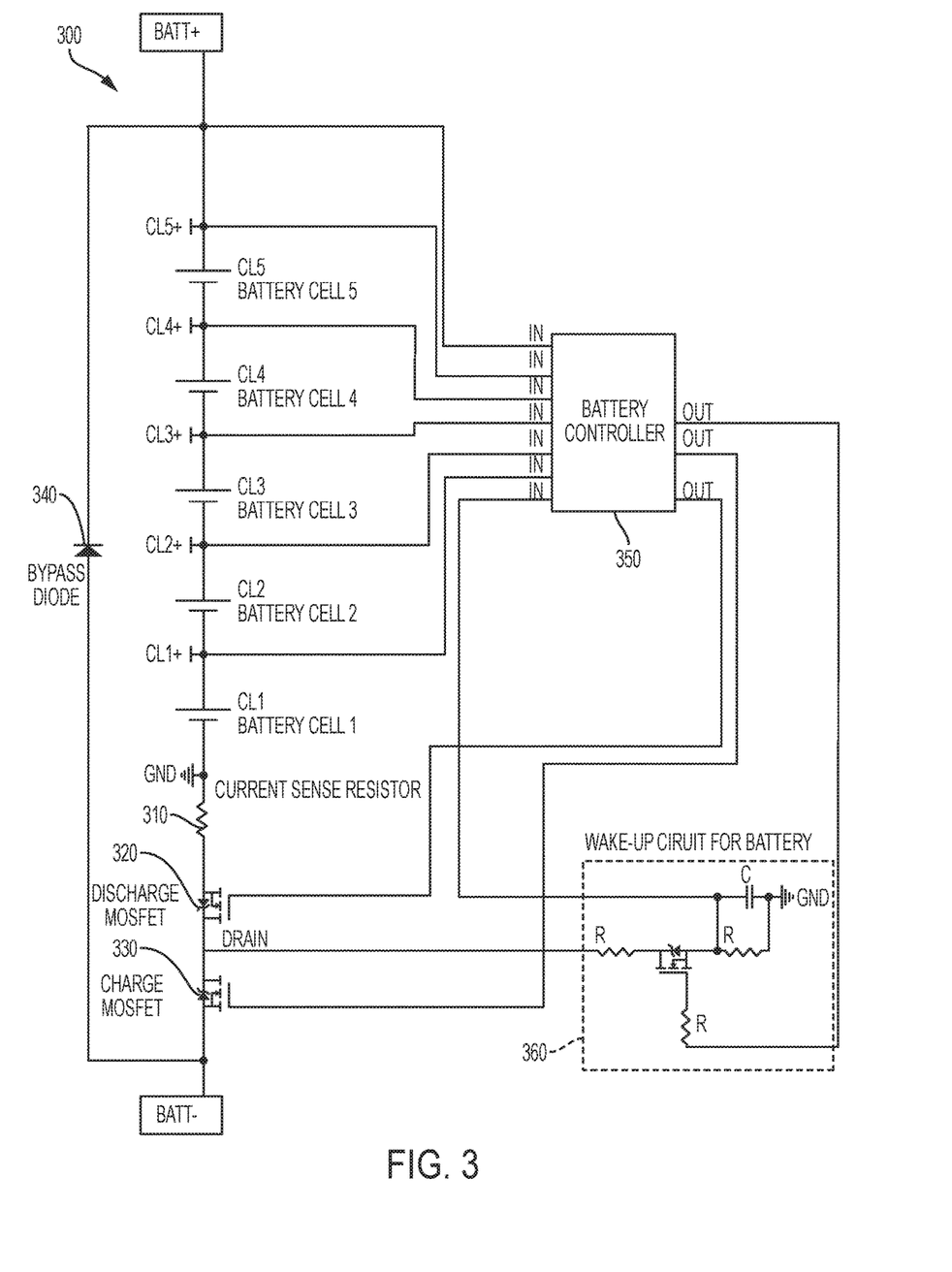
FIG. 3 is a circuit diagram of a battery pack that may be used with the miter saw of FIG. 1 in accordance with some embodiments.

FIG. 3 shows a circuit diagram of an example battery pack 300. In some embodiments, the battery pack 300 is implemented as the first battery pack 142 and the second battery pack 144. In the example illustrated, the battery pack 300 includes five cells CL1 to CL5. In some embodiments, the cells have a lithium-ion based chemistry and each provide approximately 3.6 Volts nominal voltage. In other embodiments, the cells have different chemistry, voltage output, or both. In some embodiments, ten, fifteen or another number of cells are provided in the battery pack 300. The cells CL1 to CL5 are connected in series with each other. Positive terminal of the cell CL5 is connected to battery electronics (for example, the by-pass diode 340 and the battery controller 350). Negative terminal of cell CL1 is connected in series with a current sense resistor 310, a discharge MOSFET 320, and charge MOSFET 330. A bypass diode 340 is connected across the cells CL1 to CL5, the current sense resistor 310, the discharge MOSFET 320, and the charge MOSFET 330. The battery pack 300 also includes a battery controller 350 to control the battery electronics and a battery wake-up circuit 360.

The battery controller 350 is connected to the positive terminal of each cell CL1 to CL5 to monitor the voltage for each cell CL1 to CL5. The battery controller 350 is also coupled to and receives an input from the battery wake-up circuit 360. The battery controller 350 is also coupled to and provides an output to each of the discharge MOSFET 320, the charge MOSFET 330, and the battery wake-up circuit 360.

The battery wake-up circuit 360 alerts the battery controller 350 of a charge, discharge, or idle state of the battery pack 330 in order for the battery controller 350 to activate or deactivate the appropriate MOSFET. An input of the battery wake-up circuit 360 is coupled to the drain of the discharge MOSFET 320 and the drain of the charge MOSFET 330. An output of the battery wake-up circuit 360 is connected to an input of the battery controller 350 as described above. When the battery wake-up circuit 360 detects that the battery pack 300 is connected to a power tool (for example, the miter saw 100), the battery wake-up circuit 360 provides an output indicating the connection to the battery controller 350. In some embodiments, instead of detecting and alerting a connection to a power tool, the battery wake-up circuit 360 may detect and alert a trigger actuation of the power tool. The battery wake-up circuit 360 detects that the battery pack 300 is connected to a power tool or that a trigger is actuated when the battery wake-up circuit 360 receives a current on the drain line connecting the drains of the MOSFETS 320, 300 to the battery wake-up circuit 360. The battery controller 350, upon receiving the input signal indicating a connection to a power tool or a trigger pull, closes the discharge MOSFET 320 to allow the battery pack 300 to provide power to the power tool (for example, the miter saw 100). Similarly, when the battery wake-up circuit 360 detects a charger, the battery wake-up circuit 360 alerts the battery controller 350 and the battery controller 350 closes the charger MOSFET 330.

Returning to FIG. 2, during operation, when the trigger 150 is actuated, the handle circuit board 210 draws small amount of current from the second battery pack 144 over the line 216 for the operation of the handle circuit board 210 electronics (for example, to power an LED). In the second battery pack 144, the current initially flows through the by-pass diode 340 (of the second battery pack 144) until the battery controller 350 turns on the discharge MOSFET 320, thereby, waking up the second battery pack 144. However, because no such initial current flows through the first battery pack 142, the first battery pack 142 remains idle. The battery waking circuit 250 draws small amounts of waking current (as opposed to load current) from the first battery pack 142 to wake-up the electronics of the first battery pack 142 before the operation of the motor 230. If the first battery pack 142 was idle and the second battery pack 144 was awake when operation of the motor 230 began, the first battery pack 142 may be subjected to the load current for the operation of the motor 230 before the battery controller 350 (of the first battery pack 142) turns on the discharge MOSFET 320. This load current before the discharge MOSFET 320 is turned on may result in failure of the by-pass diode 340, and thereby, failure of the first battery pack 142.

Figure 4:
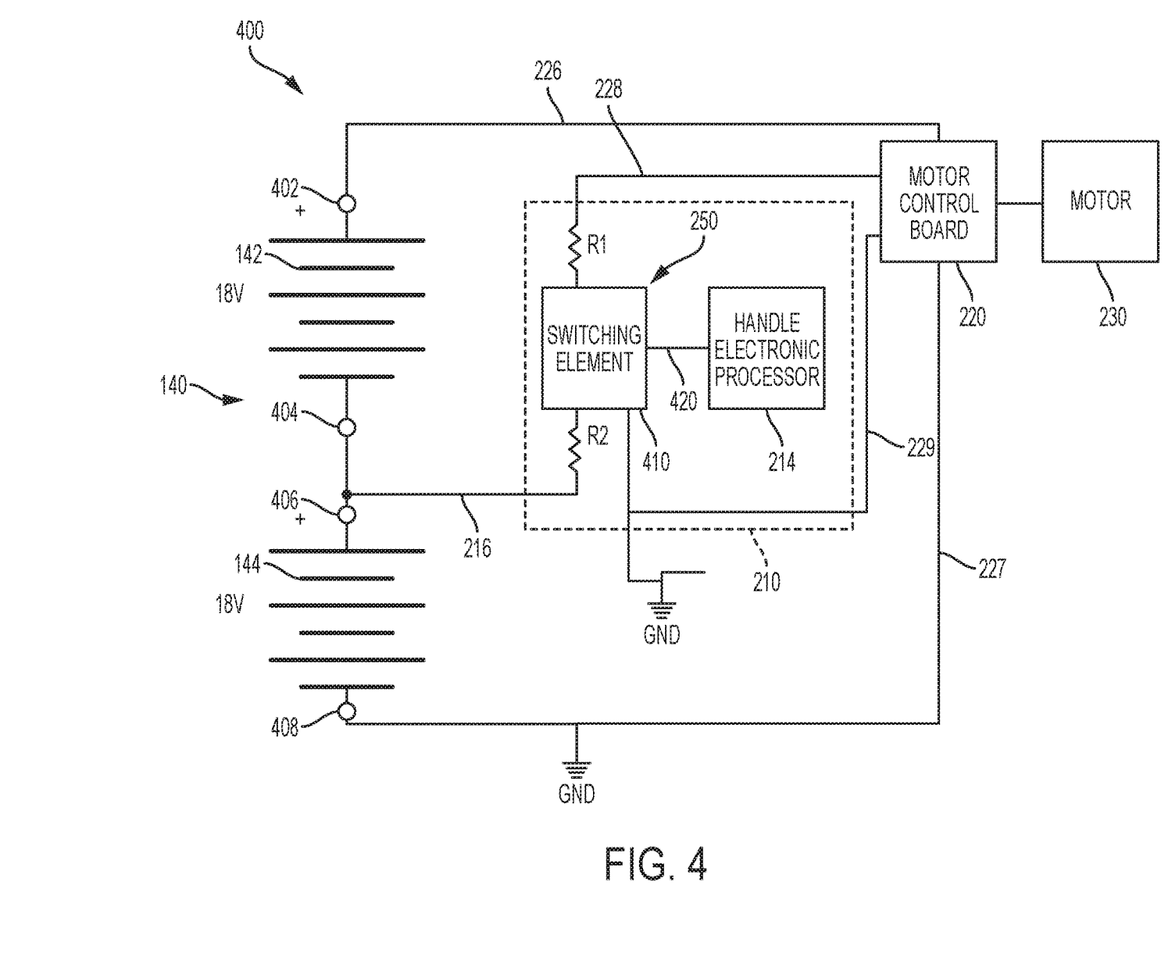
FIG. 4 is a circuit diagram of a battery waking circuit in accordance with some embodiments.

FIG. 4 shows a circuit diagram 400 of the power tool 100 with an example of the battery waking circuit 260 in further detail. In the example illustrated, the battery waking circuit 260 is connected across the first battery pack 142 of the power supply 140. The power tool 100 includes a first positive terminal 402 and a first negative terminal 404 to connect to a positive and negative terminal respectively of the first battery pack 142. The power supply 140 also includes the second battery pack 144. The power tool 100 also includes a second positive terminal 406 and a second negative terminal 408 to connect to a positive and negative terminal, respectively, of the second battery pack 144. The first negative terminal 404 is connected to the second positive terminal 406. The first positive terminal 402 is connected to the motor control board 220 over the line 226 and the second negative terminal 408 is connected to the motor control board 220 over the line 227. The power supply 140 is connected to the motor control board 220 to provide power for operation of the motor 230, as described above.

The battery waking circuit 250 includes a switching element 410 connected to the positive power supply through a first resistor R1 over the line 228. In other words, the line 228 is coupled to the first positive terminal 402 via the motor control board 220 and the line 226. The switching element 410 is connected to the first negative terminal 404 and the second positive terminal 406 over the line 216 through a second resistor R2. The switching element 410 receives control signals from the handle electronic processor 214 over the line 420. The switching element 410 may include a relay, a NPN bi-polar junction transistor, a junction field effect transistor (JFET), a metal-oxide-semiconductor field effect transistor (MOSFET), an optocoupler, a TRIAC, a silicon-controlled rectifier (SCR), and the like or a combination thereof.

In one example embodiment, the switching element 410 is an optocoupler or a relay. During operation, the handle electronic processor 214 detects an actuation of the trigger 150 with the trigger assembly 212 (see FIG. 2). Upon detecting the actuation of the trigger 150, the handle electronic processor 214 turns the switching element ON by providing a control signal over the line 420. The switching element 420 draws small amounts of current (for example, waking current) from the first battery pack 142. Once the first battery pack 142 is woken-up with the discharge MOSFET 320 of the first battery pack turned on, the handle electronic processor 214 turns the switching element 410 OFF by providing a control signal over the line 420.

Figure 5:
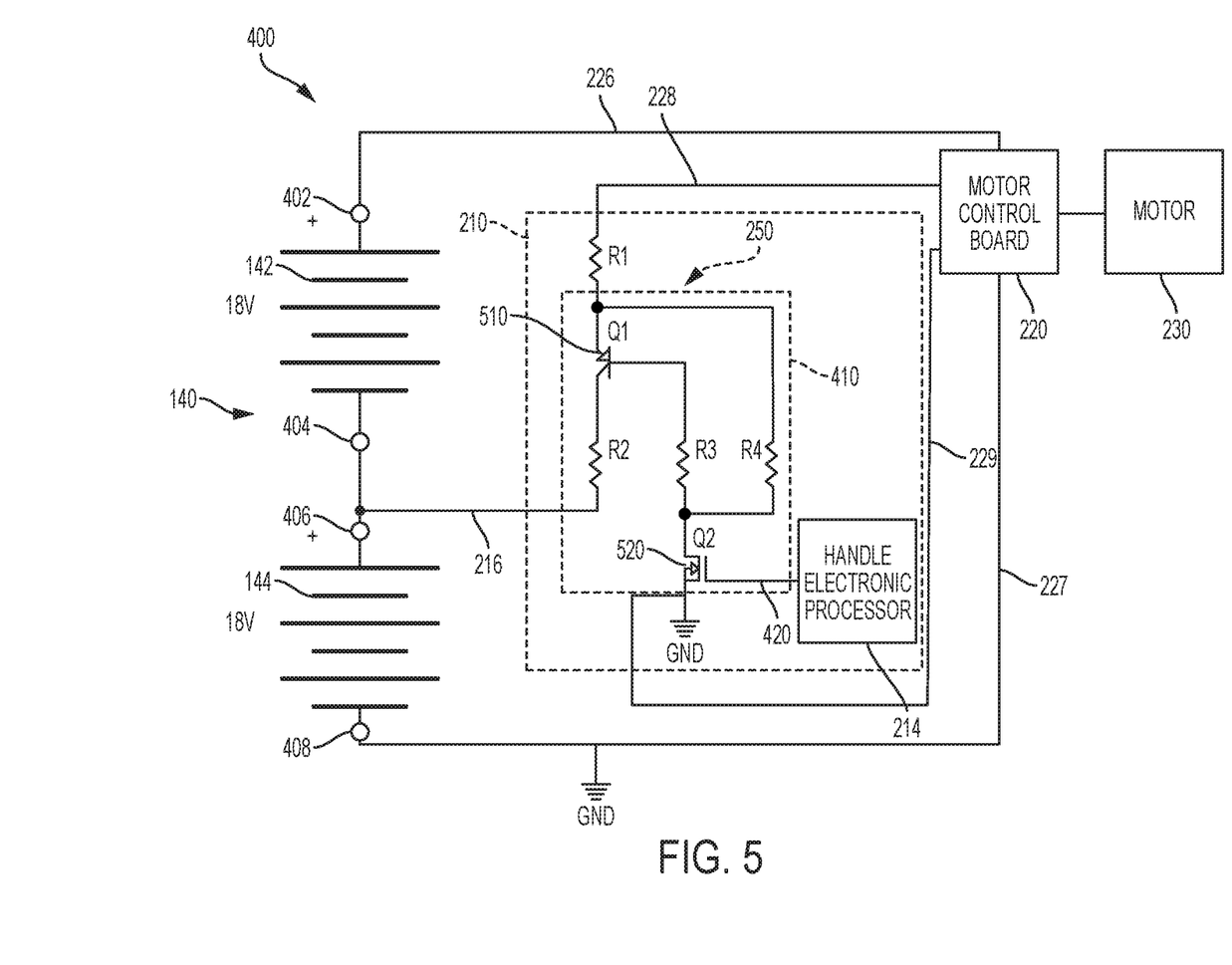
FIG. 5 is a circuit diagram of a battery waking circuit in accordance with some embodiments.

FIG. 5 illustrates the circuit diagram 400 having a particular example embodiment of the switching element 410. In the example illustrated, the switching element 410 includes a first switch 510, a second switch 520, and resistors R3 and R4. The first switch 510 is connected to the first positive terminal 402 through the first resistor R1, the line 228, the motor control board 220, and the line 226. The first switch 510 is connected to the first negative terminal 404 through a second resistor R2. The first switch 510 is controlled by a second switch 520. In the example illustrated, the first switch 510 is a PNP bi-polar junction transistor (BJT). The emitter of the first switch 510 is connected to the first positive terminal 402 through the first resistor R1 over the line 228. The collector of the first switch 410 is connected to the first negative terminal 404 through the second resistor R2 over the line 216. The base of the first switch is connected to the second switch 520. In other embodiments, the first switch 410 may be a relay, a NPN bi-polar junction transistor, a junction field effect transistor (JFET), a metal-oxide-semiconductor field effect transistor (MOSFET), an optocoupler, a TRIAC, a silicon-controlled rectifier (SCR), and the like.

The second switch 520 is connected to the base of the first switch 510 through a third resistor R3. The second switch 520 is connected to the first positive terminal 402 through a fourth resistor R4 and the first resistor R1. The second switch 520 is controlled by the handle electronic processor 214 via the line 420. In the example illustrated, the second switch 520 is an N-channel field effect transistor (FET). The drain of the second switch 520 is connected to the base of the first switch 510 through the third resistor R3 and to the first positive terminal 402 through the fourth resistor R4 and the first resistor R1. The source of the second switch 520 is connected to ground and the gate of the second switch 520 is connected to the handle electronic processor 214. In other embodiments, the second switch 520 may be a relay, a bi-polar junction transistor, a metal-oxide-semiconductor field effect transistor, an optocoupler, a TRIAC, a silicon-controlled rectifier (SCR), and the like.

In some embodiments, the resistor R1 of FIGS. 4 and 5 is coupled directly to the first positive terminal 402 via line 226, rather than indirectly via the motor control board 220. Similarly, in some embodiments, the switching element 410 of FIGS. 4 and 5 is coupled directly to the second negative terminal 408, rather than indirectly via the motor control board 220. Further, the trigger assembly 212 of the handle circuit board 210 (see FIG. 2) is not shown in FIGS. 4 and 5 to simplify the illustration.

Figure 6:
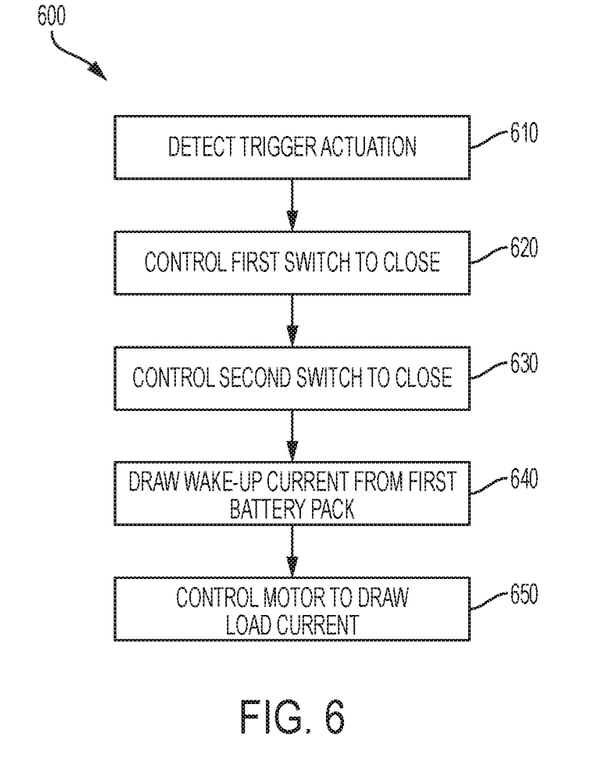
FIG. 6 is a flowchart of a method of waking up a power tool power source in accordance with some embodiments.

FIG. 6 is a flowchart illustrating one example method 600 of waking up a power tool power source. As illustrated in FIG. 6, the method 600 includes a handle electronic processor 214 detecting that the trigger 150 is actuated (at step 610). For example, as described above, in response to actuation of the trigger 150, the trigger assembly 212 provides a trigger signal to the handle electronic processor 214. When the handle electronic processor 214 detects that the trigger 150 is actuated, the handle electronic processor 214 provides a signal to close the second switch 520 (at step 620). The second switch 520, when closed, provides a path to ground to the first battery pack 142 via the resistors R1 and R4, which draws a current from the first battery pack 142. Additionally, when the second switch 520 is closed, the second switch 430 also draws a current from the base of the first switch 510, thereby closing the first switch 510 (at step 630). As such, the battery waking circuit 250 draws a small amount of current (i.e., a wake-up current) to wake up the electronics within the first battery pack 142 (at step 640). The wake-up current initially flows through a first path including the first positive terminal 402, the first resistor R1, the fourth resistor R4, and the second switch 520 to ground. When the first switch 510 is closed, the wake-up current flows through the first path which now also includes the first switch 510 and the second resistor R2 to the first negative terminal 404. The wake-up current also flows through the resistor R3 to keep the first switch 510 closed.

Upon drawing wake-up current from the first battery pack 142, as described above with respect to FIG. 3, the battery wake-up circuit 360 of the first battery pack 142 provides an input to the battery controller 350 to close the discharge MOSFET 320. The battery controller 350 closes the discharge MOSFET 320 to exit the idle state and to allow a load current to flow to the miter saw 100. The load current flows through a second path including the motor control board 220 to the second negative terminal 408. As illustrated, the first current path for the wake-up current does not include motor control board 220, while the second current path (that is, for the load current) includes the motor control board 220 and the motor 230. Thereafter, the motor control board 220 controls the switch bridge 224 to drive the motor 230 (at step 650). In some embodiments, the motor control board 220 delays driving the switch bridge 224 for a predetermined amount of time after closing the second switch 520 to ensure that the first battery pack 142 is awake before power is supplied to the motor 230. Drawing current by the motor 230 before the battery packs 142, 144 are awake can cause excess current to be drawn by certain electronics of the battery pack 142, 144, such as by the by-pass diode 340.

The wake-up current may be selected to be significantly less than the load current. The wake-up current may be selected to be in a range of values that is less than an amount of current that could cause damage to components of the battery pack, when the battery pack is not awake (i.e., in the idle state). For example, the wake-up current level may be selected, through the selection of the resistors R1 through R4, to prevent damage to the by-pass diode 340. For instance, the by-pass diode 340 may have a maximum current rating, and the wake-up current level is selected to be below that rating. In some embodiments, the wake-up current may be 9 milli-Amperes. In other embodiments, the wake-up current is in the range of 5 to 15 milli-Amperes, between 15 and 30 milli-Amperes, or another value less than an average level load current drawn from the power source during an operation of the power tool 100.

After the first battery pack 142 is woken up, the handle electronic processor 214 opens the second switch 520 to open the battery waking circuit 250 and stop drawing the wake-up current. In some embodiments, the battery waking circuit 250 may be closed for a predetermined amount of time. For example, the battery waking circuit 250 may be closed for 10 milliseconds (ms) or more, for 100 milliseconds or more, for 1 second or more, or the like. In other embodiments, the battery waking circuit 250 may be opened when the trigger 150 is released. In yet other embodiments, the battery waking circuit 250 may be opened when the handle electronic processor 214 determines that the first battery pack 142 is awake or when the handle electronic processor 214 determines that the motor 230 has started.

In some embodiments, steps 620 and 630 may be referred to as a step of controlling the switching element 410 to close. As noted above, the switching element 410 may take various forms, such as the form illustrated in FIG. 5 or a form including an optocoupler, relay, or other switching device or combination.

Figure 7:
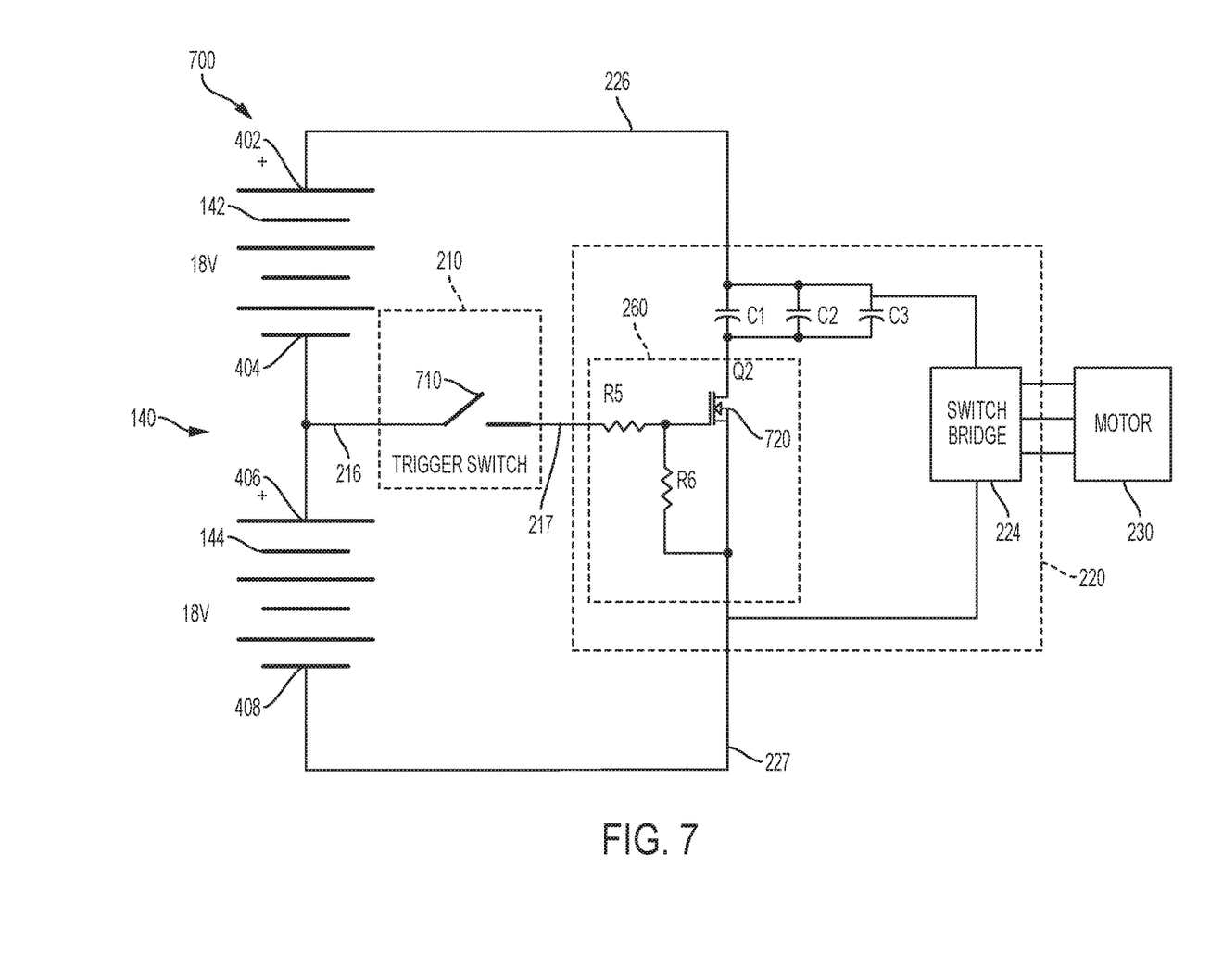
FIG. 7 is a circuit diagram of a battery leakage circuit in accordance with some embodiments.

FIG. 7 shows a circuit diagram 700 of the power tool 100 with an example of the battery leakage circuit 260. In the example illustrated, the battery leakage circuit 260 is connected across the first battery pack 142 and the second battery pack 144. The first positive terminal 402 is connected to positive terminals of three capacitors C1, C2, and C3. The capacitors C1, C2, and C3 may be, for example, electrolytic capacitors that provide a smoothing function to the power supplied to the switch bridge 224. While three capacitors C1, C2, and C3 are illustrated, in some embodiments, one, two, or another number of capacitors are used. The battery leakage circuit is connected to the negative terminals of the capacitors C1, C2, and C3. The switch bridge 224 is connected to the capacitors to receive operating power from the lines 226 and 227. The switch bridge 224 provides the operating power to the motor 230. A trigger switch 710 of the trigger assembly 212 (see FIG. 2) is connected between the line 216 that receives operating power from the second battery pack 144 and the line 217 that provides operating power to the motor control board 220. The trigger 150 and the trigger switch 710 may form an electro-mechanical switch such that, when the trigger 150 is pressed, the trigger switch 710 is closed. The handle electronic processor 214 and the motor electronic processor 222 (see FIG. 2) are not illustrated in FIGS. 4 and 5 to simplify the illustration.

The battery leakage circuit 260 includes a leakage switch 720. The leakage switch 720 is connected between the negative terminal of the capacitors C1, C2, and C3 and the second negative terminal 408 via line 227. The leakage switch 720 is controlled by the trigger switch 710. In the example illustrated, the leakage switch 720 is an N-channel field effect transistor. The drain of the leakage switch 720 is connected to the negative terminals of the capacitors C1, C2, and C3. The source of the leakage switch 720 is connected to the second negative terminal 408. The gate of the leakage switch 720 is connected to an output terminal of the trigger switch 710 through a fifth resistor R5. Gate and source of the third switch 720 are connected by a sixth resistor R6.

The capacitors C1, C2, and C3 may have leakage currents (for example, about 50 micro Amperes). The battery packs 142 and 144 will remain awake when a certain amount (for example, about 2 micro Amperes) of current is being drawn from the battery packs 142 and 144 (see above discussion of the wake-up circuit 260 of FIG. 3). Accordingly, if the leakage circuit is allowed to flow from the capacitors C1, C2, and C3, the battery packs 142, 144 may remain awake and drain power, rather than reverting back to the idle state when the trigger 150 is released. The leakage switch 620, is controlled to create an open circuit between the capacitors C1, C2, and C3 and the battery packs 142 and 144 to prevent the battery packs 142 and 144 from leaking current during idle modes and enabling the battery packs 142 and 144 to enter the idle state (that is, where the discharge MOSFETs 320 of the battery packs are turned OFF).

Figure 8:
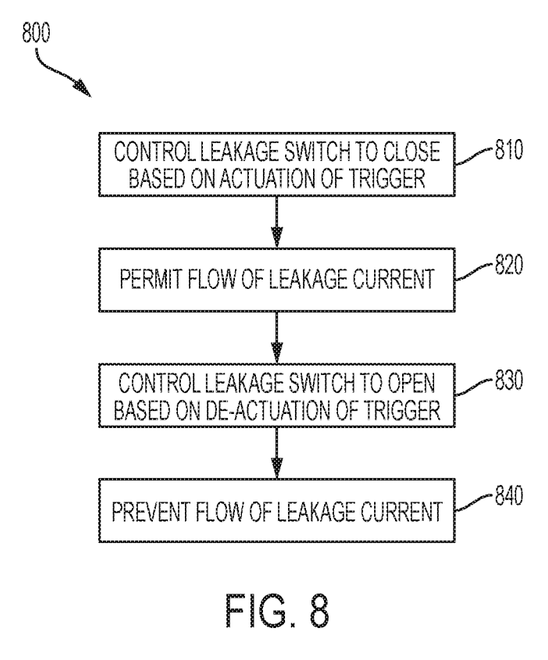
FIG. 8 is a flowchart of a method of preventing leakage current in a power tool in accordance with some embodiments.

FIG. 8 is a flowchart of an example method 800 of preventing leakage current through a power tool. As illustrated in FIG. 8, the method 800 includes controlling the leakage switch 720 to close based on actuation of the trigger 150 (at step 810). In some embodiments, when the trigger 150 is actuated, the trigger 150 closes the trigger switch 710. As such, a voltage difference is applied between the gate and source of the leakage switch 720, thereby, closing the leakage switch 720. In other embodiments, the motor electronic processor 222 or the handle electronic processor 214 may close the leakage switch 720 upon detecting that the trigger 150 is actuated. When the leakage switch 720 is closed, current flows normally to the capacitors C1, C2, and C3, and load current is provided to the switch bridge 224 to drive the motor 230. Further, because the leakage switch 720 is closed a flow of leakage current is permitted to flow through the capacitors C1, C2, and C3 (at step 820).

The method 800 also includes controlling the leakage switch 720 to open based on de-actuation of the trigger 150 (at step 830). In some embodiments, when the trigger 150 is de-actuated, that is, when the trigger 150 is released, the trigger switch 710 controlled by the trigger 150 is opened. As such, the gate and source of the leakage switch 720 are at the same voltage, thereby, opening the leakage switch 720. In other embodiments, the motor electronic processor 222 or the handle electronic processor 214 may open the leakage switch 720 upon detecting that the trigger 150 is de-actuated. When the leakage switch 720 is open, the leakage switch 720 creates an open circuit between the battery packs and the capacitors C1, C2, and C3. As such, the leakage switch 720 prevents the flow of leakage current through the capacitors C1, C2, and C3 (at step 840). Accordingly, the battery packs 142, 144 return to an idle state and control the discharging MOSFET 320 (of the respective battery packs) to open.

In the above description, several switches such as bi-polar junction transistors, field effect transistors, relays and the like are described as being closed and opened. When a switch is closed, the switch enables a current flow through the switch. That is, the switch is turned on or enabled.

Similarly, when the switch is opened, the switch prevents a current flow through the switch. That is, the switch is turned off or disabled.

In the foregoing specification, embodiments of the waking circuit and the leakage circuit are described with respect to a miter saw as a way of an example. However, the waking circuit and the leakage circuit may be implemented in other power tools such as a drill/driver, hammer drill/driver, an impact drill driver, a circular saw, a reciprocating saw, a table saw, and the like. The various power tools, including the miter saw, may include one, two, or more battery packs 300.

The handle electronic processor 214 and the motor electronic processor 222 may be implemented as microprocessors with separate memory. In other embodiments, the handle electronic processor 214 and the motor electronic processor 222 may be implemented as a microcontroller (with memory on the same chip). The handle electronic processor 214 and the motor electronic processor 222 may be implemented partially or entirely as, for example, a field-programmable gate array (FPGA), an application specific integrated circuit (ASIC), and the like.

The handle electronic processor 214 and the motor electronic processor 222 may be referred to collectively as an electronic controller. In some embodiments, the electronic controller includes the handle electronic processor 214 and the motor electronic processor 222 combined into a single processor residing on one of the handle control board 210 and the motor control board 220. In other embodiments, as illustrated in FIG. 2, the electronic controller includes the handle electronic processor 214 and the motor electronic processor 222 as separate processors.

Thus, the invention provides, among other things, a battery waking circuit and a battery leakage circuit for a power tool. Various features and advantages of the invention re set forth in the following claims.

The invention claimed is:

1. A method of waking up a power supply of a power tool including a first battery pack and a second battery pack, the method comprising:
    detecting, using an electronic controller on a circuit board assembly in the power tool, a trigger actuation;
    controlling, using the electronic controller, a battery wakeup circuit including a first switch to close based on detecting the trigger actuation, the battery wakeup circuit being on the circuit board assembly;
    drawing a wake-up current from the first battery pack, through the first switch via a first current path, upon closing the first switch; and
    controlling, using a switch bridge of a motor control circuit on the circuit board assembly, a motor to draw a load current via a second current path separate from the first switch after the first battery pack is woken-up by the wake-up current.

2. The method of claim 1, further comprising:
    controlling, using the first switch, a second switch to close based on closing the first switch, wherein drawing the wake-up current from the first battery pack occurs upon closing the first switch and the second switch.

3. The method of claim 1, wherein controlling the motor to draw the load current is delayed until a predetermined amount of time after controlling the first switch to close.

4. The method of claim 1, wherein the wake-up current flows through the first current path not including the motor, and the load current flows through the second current path including the motor, wherein the load current is prevented from flowing in the second current path until after the wake up current flows through the first current path.

5. The method of claim 1, further comprising:
    controlling, using the electronic controller, the first switch to open when the power tool is drawing the load current; and
    controlling, using the first switch, a second switch to open based on opening the first switch.

6. The method of claim 1, wherein the first battery pack includes a battery controller and a battery wake-up circuit, the method further comprising:
    determining, using the battery wake-up circuit, that the power tool is drawing the wake-up current from the first battery pack;
    providing, using the battery wake-up circuit, an indication that the power tool is drawing the wake-up current; and
    controlling, using the battery controller, a discharge MOSFET to close based on the indication.

7. The method of claim 1, wherein the wake-up current is less than a maximum current rating of a by-pass diode coupled across battery cells of the first battery pack.

8. The method of claim 1, further comprising:
    controlling, by a trigger, a leakage switch to close based on actuation of the trigger;
    permitting a flow of leakage current through a capacitor based on closing the leakage switch, the capacitor coupled to a power supply of the power tool;
    controlling, by the trigger, the leakage switch to open based on de-actuation of the trigger;
    preventing the flow of leakage current through the capacitor and the leakage switch based on opening the leakage switch; and
    controlling, via the electronic controller, the switch bridge to selectively supply power to stator coils of the motor of the power tool to drive the motor using load current from the power supply.

9. The method of claim 8, further comprising:
    closing a trigger switch based on actuation of the trigger; and
    opening the trigger switch based on de-actuation of the trigger, wherein the trigger switch controls the leakage switch to open and close.

10. The method of claim 8, wherein controlling the leakage switch to close based on the closing of the trigger switch includes coupling a control input of the leakage switch to the second battery pack of the power supply via the trigger switch, wherein the trigger switch is positioned along a control path between the second battery pack and the control input of the leakage switch.

11. The method of claim 1, wherein the motor control circuit includes the switch bridge and a motor electronic processor of the electronic controller.

12. The method of claim 1, wherein the circuit board assembly includes a handle circuit board and a motor control board.

13. The method of claim 12, wherein the handle circuit board includes a handle electronic processor, the wakeup circuit, and a trigger assembly, and the motor control board includes a motor electronic processor, a battery leakage circuit, and the switch bridge, and wherein the electronic controller includes the handle electronic processor and the motor electronic processor.

14. A power tool comprising:
    a first battery pack having a first housing that houses a first battery cell and a first controller;

a second battery pack connected in series with the first battery pack and having a second housing that houses a second battery cell and a second controller;

a battery wakeup circuit including a first switch connected to the first battery pack along a first current path, the battery wakeup circuit being on a circuit board assembly in the power tool; and an electronic controller on the circuit board assembly, and that is coupled to and controlling the first switch, the electronic controller configured to:

detect a trigger actuation, close the first switch based on detecting the trigger actuation to draw a wake-up current on the first current path, including the first switch, from the first battery pack, and control, using a switch bridge of a motor control circuit on the circuit board assembly, a motor to draw a load current along a second current path separate from the first switch after the first battery pack is woken up.

15. The power tool of claim 14, further comprising a second switch across the first battery pack and having a control input coupled to the first switch, wherein closing the first switch causes the second switch to close, and the wake-up current is drawn upon closing the first switch and the second switch.

16. The power tool of claim 14, wherein the electronic controller is further configured to:

determine that the power tool is drawing the load current; and control the first switch to open, the first switch controlling a second switch to open.

17. The power tool of claim 14, wherein the first battery pack further comprises:

a battery wake-up circuit configured to:

determine that the power tool is drawing the wake-up current from the first battery pack, and provide an indication that the power tool is drawing the wake-up current; and a battery controller configured to control a discharge MOSFET to close based on the indication.

18. The power tool of claim 14, wherein the first current path does not include the motor, and the second current path includes the motor.

19. The power tool of claim 14, wherein the wake-up current is less than an average of the load current during an operation of the power tool.

20. The power tool of claim 14, further comprising:

a power supply having a positive terminal and a negative terminal;

a capacitor coupled across the positive terminal and the negative terminal of the power supply;

a leakage switch connected between the capacitor and the negative terminal;

the motor coupled across the capacitor and the leakage switch; and a trigger controlling the leakage switch such that the leakage switch permits a flow of leakage current through the capacitor when the trigger is actuated and prevents the flow of leakage current through the capacitor when the trigger is de-actuated.

21. The power tool of claim 20, further comprising a trigger switch coupled to the leakage switch, wherein the trigger switch is closed when the trigger is actuated and opened when the trigger is de-actuated.

22. The power tool of claim 21, wherein the power tool includes the first battery pack and the second battery pack coupled in series, and the trigger switch is coupled to the negative terminal of the first battery pack and the positive terminal of the second battery pack.

23. The power tool of claim 20, wherein the power tool includes the switch bridge and the electronic controller, the electronic controller configured to:

control the switch bridge to selectively supply power to stator coils of the motor of the power tool to drive the motor using load current from the power supply.

24. The power tool of claim 14, wherein the motor control circuit includes the switch bridge and a motor electronic processor of the electronic controller.

25. The power tool of claim 14, wherein the circuit board assembly includes a handle circuit board and a motor control board.

26. The power tool of claim 25, wherein the handle circuit board includes a handle electronic processor, the battery wakeup circuit, and a trigger assembly and the motor control board includes a motor electronic processor, a battery leakage circuit, and the switch bridge, and wherein the electronic controller includes the handle electronic processor and the motor electronic processor.

* * * * *